(12) United States Patent
Lou et al.

(10) Patent No.: US 9,127,572 B2
(45) Date of Patent: Sep. 8, 2015

(54) OXY FIRED POWER GENERATION SYSTEM AND METHOD OF OPERATING THE SAME

(71) Applicant: ALSTOM Technology Ltd, Baden (CH)

(72) Inventors: Xinsheng Lou, West Hartford, CT (US); Shizhong Yang, Bloomfield, CT (US)

(73) Assignee: ALSTOM TECHNOLOGY LTD., Baden (CH)

( * ) Notice: Subject to any disclaimer, the term of this patent is extended or adjusted under 35 U.S.C. 154(b) by 144 days.

(21) Appl. No.: 14/057,826

(22) Filed: Oct. 18, 2013

(65) Prior Publication Data

US 2015/0107248 A1 Apr. 23, 2015

(51) Int. Cl.
*F01K 13/02* (2006.01)
*F01K 11/02* (2006.01)
*G05B 15/02* (2006.01)
*F22B 31/00* (2006.01)

(52) U.S. Cl.
CPC .............. *F01K 13/02* (2013.01); *F01K 11/02* (2013.01); *F22B 31/0076* (2013.01); *F22B 31/0084* (2013.01); *G05B 15/02* (2013.01)

(58) Field of Classification Search
CPC ..... F01K 13/02; F01K 11/02; F22B 31/0084; F22B 31/0076; G05B 15/02
USPC ............................ 60/646, 657, 660, 664, 667
See application file for complete search history.

(56) References Cited

U.S. PATENT DOCUMENTS

| | | | |
|---|---|---|---|
| 6,382,958 B1 * | 5/2002 | Bool, III et al. | 431/2 |
| 6,505,567 B1 | 1/2003 | Anderson et al. | |
| 6,702,570 B2 * | 3/2004 | Bool, III et al. | 431/11 |
| 7,954,458 B2 | 6/2011 | Bozzuto et al. | |
| 8,171,893 B2 * | 5/2012 | Morin et al. | 122/4 D |
| 2009/0133611 A1 | 5/2009 | Morin et al. | |
| 2009/0211503 A1 * | 8/2009 | Andrus, Jr. et al. | 110/345 |
| 2010/0236500 A1 | 9/2010 | Douglas et al. | |
| 2012/0052450 A1 | 3/2012 | Lou et al. | |
| 2012/0143382 A1 | 6/2012 | Lou | |
| 2012/0145052 A1 | 6/2012 | Levasseur et al. | |

* cited by examiner

*Primary Examiner* — Hoang Nguyen
(74) *Attorney, Agent, or Firm* — Buchanan Ingersoll & Rooney PC (57) ABSTRACT

An electricity production system configured to operate in accordance with a method of operating an electricity production system that at least includes the steps of: determining an oxygen distribution between oxygen gas to be separated by an air separation unit ("ASU") and oxygen gas stored in a storage tank of the ASU to be fed to the boiler unit, determining a carbon capture value for a gas processing unit, determining a power consumption value for the gas processing unit and the ASU, determining a total power demand value based on the power consumption value of the gas processing unit and the ASU, and on a determined electricity demand, and controlling the boiler unit, the turbine, the ASU, and the gas processing unit based on the determined total power demand along with correcting signals generated from a coordinated Model Predictive Control.

20 Claims, 3 Drawing Sheets

OXY FIRED POWER GENERATION SYSTEM AND METHOD OF OPERATING THE SAME

FIELD

The present disclosure relates to a power generation system that utilizes at least one oxy-fired boiler unit, at least one steam turbine unit, at least one air separation unit and at least one gas processing unit as well as a control system for such a power generation system, and methods of operating the same.

BACKGROUND

Energy production systems that burn coal to produce power may include a boiler and a turbine. Energy production systems that are utilized in electricity production and other components of such systems are described, for example, in U.S. Patent Application Publication Nos. 2012/0052450, 2012/0145052, 2010/0236500, and 2009/0133611 and U.S. Pat. Nos. 7,954,458 and 6,505,567.

Oxy-combustion is a development for carbon dioxide capture and sequestration in fossil fuel (e.g. coal, etc.) fired power plants to replace combustion air with a mixture of oxygen and recycled flue gas to create a high carbon dioxide content flue gas stream that can be more easily processed for sequestration. In U.S. Patent Application Publication No. 2012/0145052, it is disclosed that some oxy-combustion systems may include an air separation unit, a boiler, an air pollution control system, and a gas processing unit for separating carbon dioxide from flue gas. The heat from the flue gas of the boiler may be captured by steam, which is then used to drive a steam turbine generator to produce electricity. The flue gas may then be processed to remove certain pollutants (e.g. $NO_x$, $SO_x$, etc.) and a portion of the treated flue gas may then be recycled to the boiler to effect combustion.

SUMMARY

A method of operating an electricity production system having at least one oxy-combustion boiler unit, a turbine for electricity generation, an air separation unit and a gas processing unit comprises for each of a first mode, a second mode, and a third mode of operation: determining an oxygen distribution between oxygen gas to be separated by the air separation unit and oxygen gas stored in a storage tank of the air separation unit to be fed to the boiler unit, determining a carbon capture value for the gas processing unit via a scheduler, determining a power consumption value for the gas processing unit and the air separation unit based on the carbon capture value and the determined oxygen distribution and determining a total power demand based on the power consumption value of the gas processing unit and the air separation unit and on a determined electricity demand from one of a pre-specified electricity demand value, a grid frequency value, and an automatic dispatch system value. The method may also include the step of controlling the boiler unit, the turbine, the air separation unit, and the gas processing unit based on the determined total power demand along with correcting signals generated by a coordinated Model Predictive Control.

An electricity production system may comprise an oxy-fired boiler unit configured to combust fuel and generate steam; an air separation unit configured to separate oxygen gas from air for feeding the oxygen gas to the boiler unit for combustion of fuel; a turbine configured to receive steam emitted by the boiler unit for generating electricity; a gas processing unit configured to receive the flue gas emitted by the boiler unit for capturing carbon dioxide; and a controller communicatively connected to the boiler unit, the turbine, the air separation unit, and the gas processing unit. The controller may have at least one non-transitory memory and at least one processor connected to the memory. The controller may be configured to: determine an oxygen distribution between oxygen gas to be separated by the air separation unit and oxygen gas stored in a storage tank of the air separation unit to be fed to the boiler unit, select a carbon capture value for the gas processing unit, determine a power consumption value for the gas processing unit and the air separation unit, determine a total power demand based on the power consumption value for the gas processing unit and the air separation unit, and on a determined electricity demand from one of a pre-specified electricity demand value, a grid frequency value, and an automatic dispatch system value, and control the boiler unit, the turbine, the air separation unit, and the gas processing unit based on the determined total power demand along with correcting signals generated by a coordinated Model Predictive.

A controller for an electricity production system having an oxy-fired boiler unit and a turbine may comprise at least one processor, at least one non-transitory memory communicatively connected to the at least one processor, and at least one transceiver communicatively connected to the at least one processor. The controller may be configured to: determine an oxygen distribution between oxygen gas to be separated by an air separation unit and oxygen gas stored in a storage tank of the air separation unit to be fed to the boiler unit, select a carbon capture value for a gas processing unit, determine a power consumption value for the gas processing unit and the air separation unit; determine a total power demand based on the power consumption value for the gas processing unit and the air separation unit, and on a determined electricity demand from one of a pre-specified electricity demand value, a grid frequency value, and an automatic dispatch system value, and control the boiler unit, the turbine, the gas processing unit and the air separation unit based on the determined total power demand along with correcting signals from a coordinated Model Predictive Control.

BRIEF DESCRIPTION OF THE DRAWINGS

Exemplary embodiments of electricity production systems and associated exemplary methods are shown in the accompanying drawings. It should be understood that like reference numbers used in the drawings may identify like components, wherein.

Other details, objects, and advantages of embodiments of the innovations disclosed herein will become apparent from the following description of exemplary embodiments and associated exemplary methods.

DETAILED DESCRIPTION

Applicants have discovered that operations of an electricity production system having a fuel supply 101 that supplies fuel for combustion to at least one oxy-fired boiler unit 103 that supplies steam to at least one turbine 105 can be coordinated with operations of a gas processing unit ("GPU") and air separation unit ("ASU") to provide an improvement in reducing carbon emissions and also permit the electricity production system to be operated in a manner that maximizes, to the operator of the electricity production system, value from carbon capture operations and electricity production operations in compliance with applicable government regulations. Exemplary energy production systems and methods of operating such systems, as disclosed herein, can also permit operation of the system to comply with applicable government regulations to produce electrical power with a relatively low carbon footprint.

An electricity production system may include a fuel supply 101 that feeds fuel for combustion to a boiler unit 103. The electricity production may also include a turbine 105 that receives steam from the boiler unit to generate electricity. The electricity production system may also include a conduit that includes a first valve between the boiler unit and the turbine that steam encounters as it passes from the boiler unit 103 to the turbine 105. This first valve may be a Main Control Valve ("MCV"), for example, and is the valve at which such fluid is introduced into the turbine 105. The term "throttle pressure" may refer to the pressure of the fluid passing from the boiler unit 103 to the turbine as it is enters the MCV.

Figure 1:
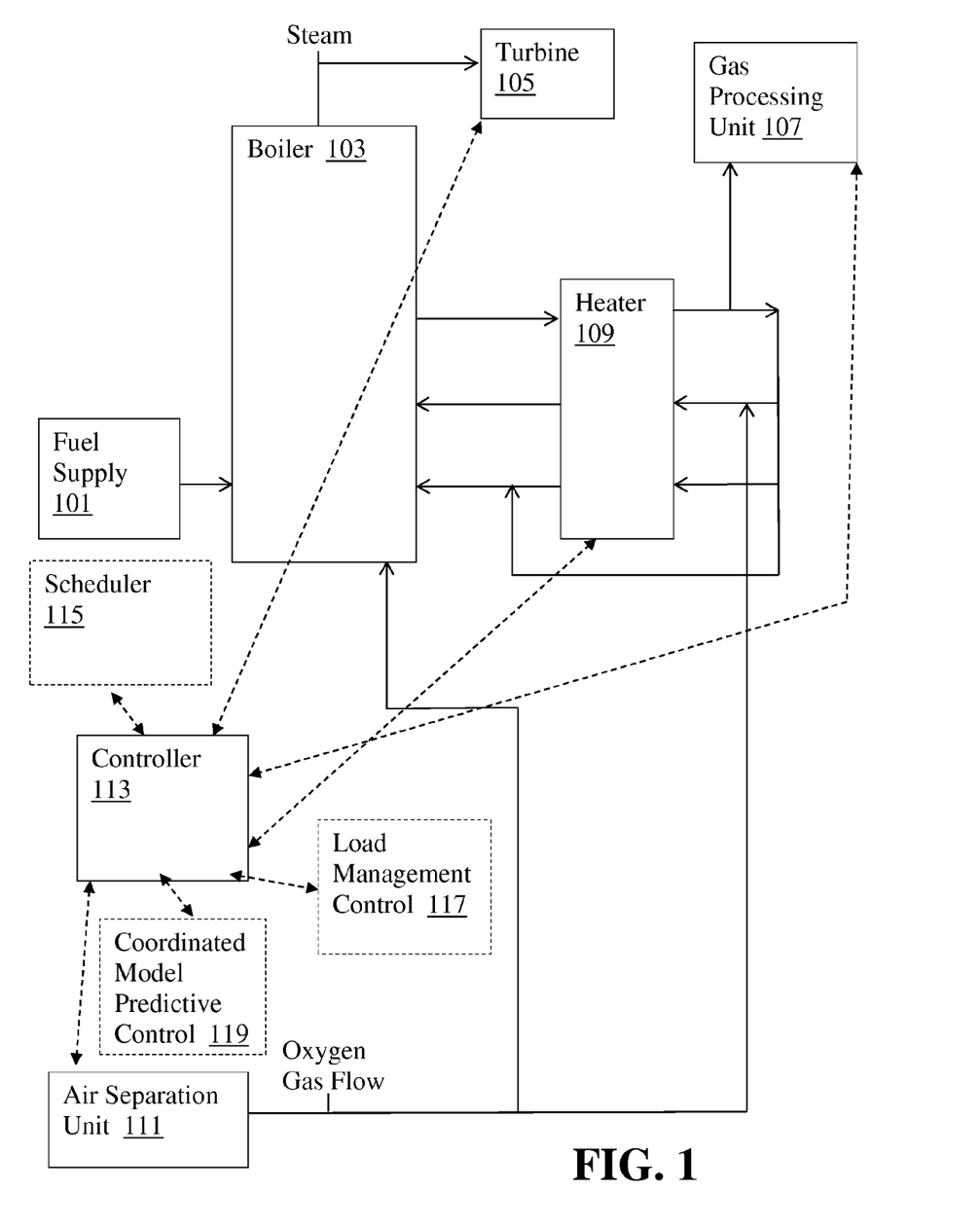
FIG. 1 is a block diagram of a first exemplary embodiment of an electricity production system.
Figure 2:
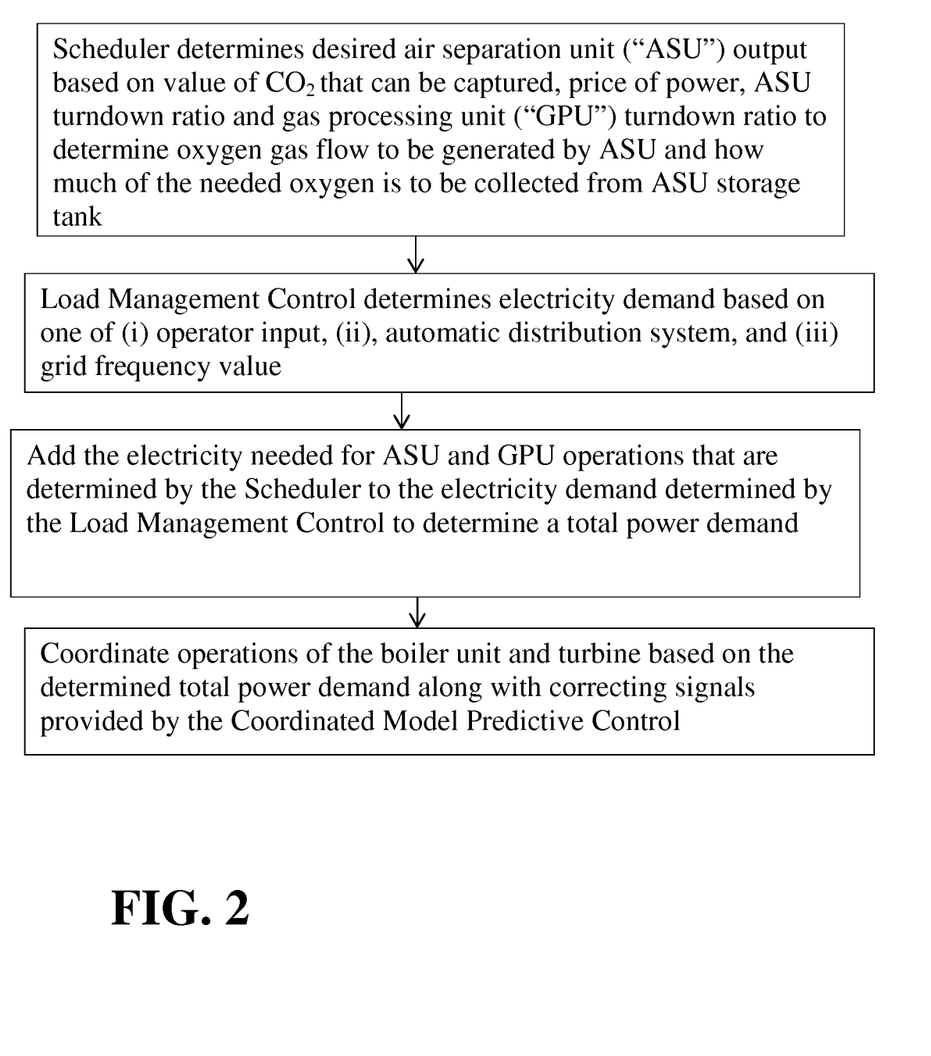
FIG. 2 is a flow chart illustrating a first exemplary embodiment of a method of determining a mode in which to control operation of an electricity production system
Figure 3:
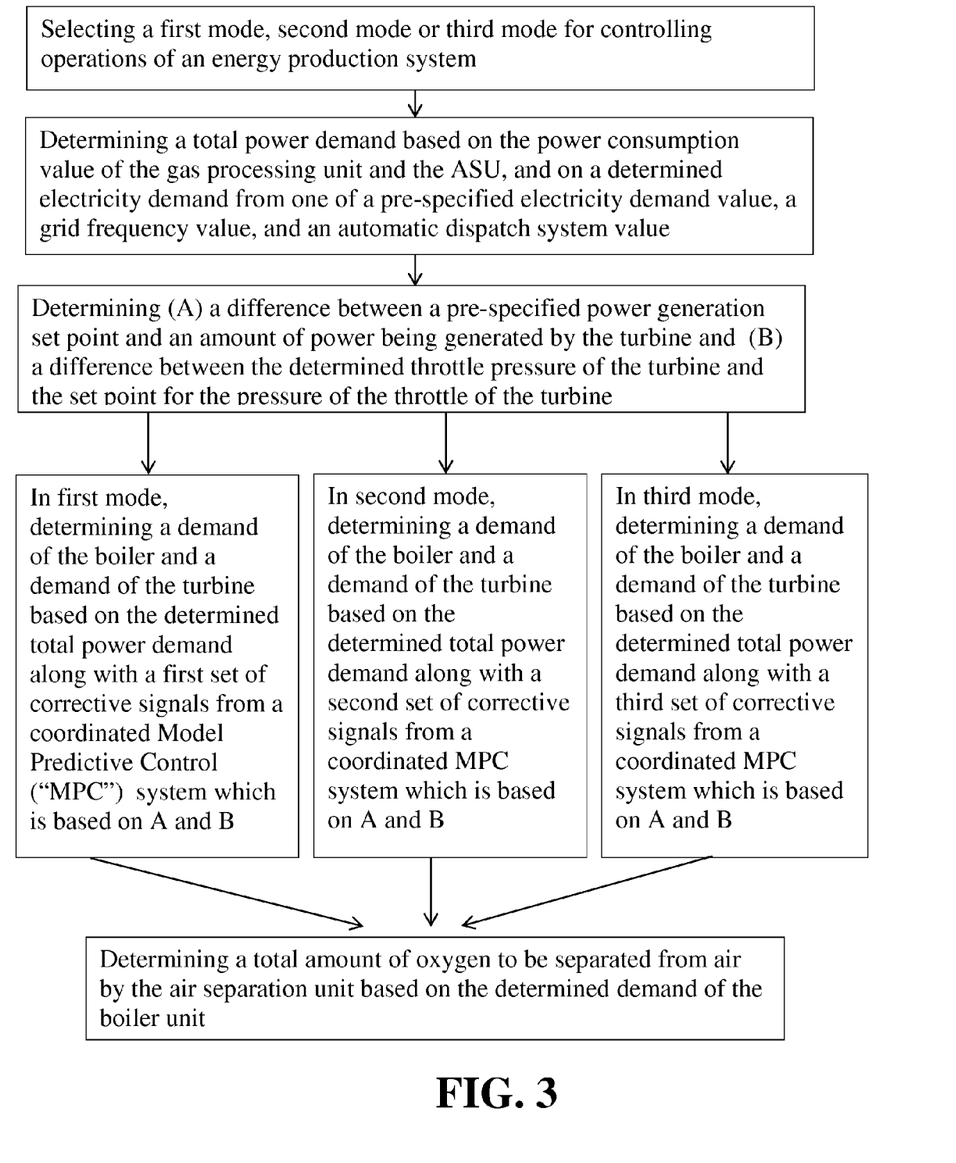
FIG. 3 is a flow chart illustrating an exemplary embodiment of a method of controlling operation of an electricity production system.

Referring to FIGS. 1-3, an exemplary method of operating an electricity production system may be configured for implementation in connection with an electricity production system having at least one oxy-combustion boiler unit 103 and a turbine 105 for electricity generation. A fuel supply 101 may supply fuel, such as pulverized coal or other fossil fuel, to the boiler unit 103 so that a furnace of the boiler unit 103 may combust the fuel. The furnace of the boiler unit 103 may include one or more burners that combust the fuel to form a flue gas that comprises products of the combusted fuel, such as steam ($H_2O$), carbon dioxide ($CO_2$), and carbon monoxide (CO). The heat release from combustion is absorbed by the water and turns the water into high temperature, high pressure steam. Such steam is fed into the steam turbine 105 to generate electricity. Flue gas emitted by the boiler is fed to a series of air pollution control systems for cleaning. After cleaning, one portion of the flue gas is recycled back to the boiler and the other portion is fed into the GPU 107 for $CO_2$ capture. The $CO_2$ may be captured by use of any of a number of suitable mechanisms such as absorption mechanisms, adsorption mechanisms, or combinations of both such mechanisms. At least a portion of the recycled flue gas may be heated in a heater 109, which may be a heat exchanger or other type of heater device, prior to being fed to the boiler unit 103. Oxygen gas that is separated from air by an ASU 111 may be mixed with the recycled flue gas to form one or more oxidant flows for feeding to the boiler unit 103 for combustion of the fuel. Additionally, oxygen from the ASU 111 that is created by separating oxygen gas may be supplied directly to the boiler unit. At least a portion of the oxygen gas from the ASU 111 may be from a storage tank in which oxygen that has been separated from air by the ASU 111 is stored prior to being mixed with any recycled flue gas flow or otherwise fed to the boiler unit 103. A controller 113 may be communicatively connected to the control system of the ASU 111, the control system of the GPU 107, the control system for the boiler unit 103, the control system for the turbine 105, as well as other elements of the electricity production system (e.g. valves, the heater 109, etc.) to oversee and manage operations of the electricity production system. The controller 113 may be at least one computer device having at least one processor communicatively connected to non-transitory memory and at least one transceiver. The controller 113 may also be configured to receive data from an operator, a grid frequency, a value corresponding to a change in grid frequency, or an automatic dispatch system ("ADS") that may identify a desired electricity output for the electricity production system to meet electricity demand from elements that are external to the electricity production system such as residential units and commercial units that may be connected to the electricity production system to receive and use electricity generated by the electricity production system in exchange for paying for the received and used electricity.

It should be appreciated that a conduit that includes a plurality of ducts, pipes, valves, vessels, or other conduit elements may be configured to permit the oxygen and flue gas to flow to and from different elements of the electricity production system. For example, portions of the conduit may extend from the boiler unit 103 to the turbine 105 for steam to flow from the boiler unit 103 to the turbine 105 and other portions of the conduit may extend to the GPU 107, a heater 109, and ASU 111 for facilitating and adjusting the flow of fluid to and from the boiler unit 103 or turbine 105. Measuring devices such as sensors, detectors, or other type of measuring units may be connected to the conduits and other elements of the electricity production system as well (e.g. furnace of the boiler unit 103, turbine 105, GPU 107, etc.). The measuring devices may be communicatively connected to the controller 113 to provide data relating to measurements of fluid flows being passed to the boiler unit 103, turbine 105, GPU 107, or heater 109 or being output from the ASU 111. For instance, measuring devices may communicate data relating to ASU storage tank levels, ASU 111 operations, oxygen gas being fed to different oxidant flows that are fed to the boiler unit 103, the pressure of steam being passed to the turbine, or the temperature, pressure or flow rate of fluid being passed to the turbine 105, boiler unit 103, GPU 107, or heater 109.

The electricity production system may be configured to operate in multiple modes, such as a first mode, second mode and third mode of operation. The first, second and third modes could each be one of a boiler following mode, a turbine following mode, and a coordinated control mode. Of course, any of the first, second, and third modes could also be configured as a different type of operational mode.

For each mode of operation, the operation of the electricity production system may be configured so that a determination is made with respect to oxygen distribution between oxygen gas to be separated by an ASU 111 and oxygen gas stored in a storage tank of the ASU 111 to be fed to the boiler unit 103. The determining of the oxygen distribution between oxygen gas to be separated by the ASU 111 and oxygen gas stored in the storage tank of the ASU 111 to be fed to the boiler unit 103 may be based on cost of operation of the ASU 111, an amount of oxygen gas stored in the storage tank of the ASU 111, and costs related to reducing or increasing the oxygen separation output of the ASU 111.

Additionally, a carbon capture value for the GPU 107 may be selected. The carbon capture value may be based on the oxygen distribution and could also be based on other variables, such as an amount of credit or price to be awarded for a pre-specified amount of $CO_2$ that the GPU 107 may capture from flue gas emitted by the boiler unit 103. For instance, the carbon capture value for the GPU 107 may be based on a cost associated with capture of carbon and credits to be allocated for that capture of carbon. Additional cost factors such as factors related to maintenance of the ASU 111 and GPU 107 and factors related to costs incurred by turning down output of the ASU 111 and GPU 107 and subsequently returning the GPU 107 and ASU 111 to higher levels of output may be factored into the determination for how much carbon is to be captured by the GPU 107 and how much oxygen is to be separated from air by the ASU 111. For instance, an ASU turndown ratio and a GPU turndown ratio may be included within the determination made as to how much carbon is to be captured from flue gas via the GPU 107 and how much oxygen gas is to be separated by the ASU 111. It should be appreciated that the ASU turndown ratio and a GPU turndown ratio may each be pre-specified values that correspond to costs associated with reducing or increasing ASU and GPU operations.

A power consumption value for the GPU and the ASU based on the carbon capture value as well as the determined oxygen distribution may be determined. The power value for the GPU 107 and the ASU 111 may be based on: (i) the determined oxygen distribution between oxygen gas to be separated by the ASU 111 and oxygen gas stored in the storage tank of the ASU 111; and (ii) a determined amount of carbon to be captured by the GPU 107.

A total power demand value may be determined based on the power consumption value of GPU 107 and the ASU 111, and on a determined electricity demand from one of a pre-specified electricity demand value, a grid frequency value, and an automatic dispatch system value. The boiler unit 103, the turbine 105, the ASU 111, and the GPU 107 may be controlled based on the determined total power demand along with correcting signals generated by a coordinated Model Predictive Control ("MPC") that are based on a difference between a determined total power demand and actual power generation, and on a difference between a determined throttle pressure and a throttle set point. Other elements of the electricity production system may also be controlled based on the determined total power demand, such as a heater 109 for heating recycled portions of flue gas emitted by the boiler that may be mixed with oxygen separated by the ASU for feeding to the boiler unit 103 for combusting the fuel.

For example, a first mode of operation may be configured as a boiler following mode. The first mode of operation may be determined based on a determination that this mode is the most beneficial mode to operate under in view of a current carbon capture value determined by a scheduler and the value of electricity to be produced by the system. The carbon capture value may be set based on a value set by regulators or a regulator run marketplace. The carbon capture value could also be based on estimate of such a value that an operator may specify. In the selected boiler following mode, a total unit load demand may be based on the amount of power consumption value of the GPU 107 and the ASU 111 and on the determined electricity demand from the one of the operator pre-specified electricity demand value, the grid frequency value, and the automatic dispatch system value. The ASU 111 and boiler unit 103 may then be controlled by correcting the total unit load demand with the signal generated by the coordinated MPC to maintain throttle pressure of the turbine within a pre-specified throttle pressure value and to make the power generation meet the total unit load demand. A demand for the turbine may also be determined by correcting the total unit load demand with the signal generated by the coordinated MPC and the turbine 105 may be controlled to maintain throttle pressure of the turbine within a pre-specified throttle pressure value and to make the power generation meet the total unit load demand.

At other times, a different mode of operation may be determined to be the most beneficial mode to operate under in view of a current carbon capture value determined by a scheduler and the value of electricity to be produced by the system. For instance, a second mode may be selected that is configured as a turbine following mode. When operating under the second mode, the operations of the turbine 105 may be controlled by the coordinated MPC based on a difference between a determined total power demand and actual power generation, and on a determined throttle pressure and a difference between the determined throttle pressure and a throttle pressure set point. A boiler master demand may also be determined with a feed forward indexed with the determined unit load demand and trimmed by the coordinated MPC for controlling operation of the boiler unit 103.

At yet other times, a third mode of operation may be selected as being the mode that is determined to be the mode of operation that is most beneficial. The selected third mode may be configured as a coordinated control mode. In the third mode, the boiler unit 103 and the turbine unit 105 may be controlled by correcting the total unit load demand with the signals generated by the coordinated MPC to maintain throttle pressure of the turbine within a pre-specified throttle pressure value and to make the power generation meet the total unit load demand.

As may be appreciated from FIG. 1, embodiments of the electricity production system may include an oxy-fired boiler unit 103 configured to combust fuel and generate steam, an ASU 111 configured to separate oxygen gas from air for feeding the oxygen gas to the boiler unit for combustion of fuel, a turbine 105 configured to receive steam when emitted by the boiler unit 103 for generating electricity, a GPU 107 configured to receive the flue gas emitted by the boiler unit for recapturing carbon, and a controller 113 communicatively connected to the boiler unit 103, the turbine 105, ASU 111, and GPU 107. The controller 113 may have at least one non-transitory memory (e.g. flash memory, a hard drive, etc.) and at least one processor (e.g. a processor such as for example an Intel® Pentium® processor, an Intel® Core™ processor or an Intel® Processor i3-4158U made by Intel Corporation, a plurality of interconnected microprocessors, or other type of processor) connected to the memory. The controller 113 may be configured to: determine an oxygen distribution between oxygen gas to be separated by the ASU 111 and oxygen gas stored in a storage tank of the ASU 111 to be fed to the boiler unit 103, select a carbon capture value for the GPU 107, determine a power value for the GPU 107 and ASU 111, and control the boiler unit 103, the turbine 105, the ASU 111, and the GPU 107 based on the power consumption value for the GPU 107 and the ASU 111, and on a determined electricity demand from one of an operator pre-specified electricity demand value, a grid frequency value, and an automatic dispatch system value.

It should be appreciated that the controller 113 may be configured as a computer device that has at least one transceiver for communicating with other elements of the electricity production system. For instance, the controller 113 may be a programmable logic controller, a distributed control system ("DCS"), a workstation, a server, or other type of computer device. The at least one transceiver may permit the controller 113 to communicate via a wired communication path, a wireless communication path, or a communication path defined by a combination of wired and wireless communication routes. The communications of the controller may pass through different intermediate nodes as well, such as base stations, access points, or other elements of a network for communications with different elements.

In some embodiments of the system, the controller 113 may control operations of the electricity production system based on a coordinated Model Predictive Control 119 such that the controller 113 predicts the future dynamic behavior of the system over a first prediction horizon time period based on measurements obtained at an initial time and subsequently updates its optimal control actions based on subsequent measurement data received after the initial time. Such process measurement data may be received periodically at different sampling time intervals to provide a feedback mechanism to the controller 113 and the updated control actions may be sent periodically at different sampling time intervals to the controller 113 (e.g. as a DCS) to optimize the coordinated operation among the boiler unit 103, the ASU 111, the GPU 107 and the turbine 105.

In some embodiments, the controller 113 may include a scheduler 115 and a load management control 117, which are illustrated in broken line in FIG. 1. For instance, the scheduler 115 and load management 117 control may be defined within the controller 113. In other embodiments, the scheduler 115 and load management control 117 may be separate computer devices that are communicatively coupled to the controller 113. When separate computer devices, it should be appreciated that the scheduler 115 and load management control 117 may be defined in non-transitory memory of those devices and be executed by one or more processors of those devices for running the load management control 117 and scheduler 115 and communicating with the controller 113 via at least one transceiver. The controller 113 may also include a coordinated Model Predictive Control 119 that is defined in the memory of the controller 113 or is defined in the non-transitory memory of a separate computer device that executes the coordinated Model Predictive Control 119 via a processor (e.g. a processor such as for example an Intel® Pentium® processor, an Intel® Core™ processor or an Intel® Processor i3-4158U made by Intel Corporation, a plurality of interconnected microprocessors, or other type of processor) and communicates with the controller 113 via a transceiver. When separate computer devices, the separate computer devices of the coordinated Model Predictive Control 119, load management control 117, and scheduler 115 may be, for example, a workstation, a computer, a server, a controller, or other type of computer device having at least one processor (e.g. a processor such as for example an Intel® Pentium® processor, an Intel® Core™ processor or an Intel® Processor i3-4158U made by Intel Corporation, a plurality of interconnected microprocessors, or other type of processor) communicatively connected to at least one transceiver and at least one non-transitory memory (e.g. flash memory or a hard drive, etc.).

The load management control 117 may communicate with a grid and an automatic dispatch system to receive data relating to an external electricity production demand for electricity output of the system for providing electricity to customers of the operator of the electricity production system. An operator may also provide input via at least one input device such as a keyboard, mouse or other communication input element that identifies such a value.

The scheduler 115 may be configured to provide a real-time scheduling for operations of the system based on variables relating to the current electricity market, local operation and control constraints (e.g. electricity production capacity, regulatory requirements applicable to the location of the electricity production system that can affect output capacity of the system, etc.). The scheduler 115 may be configured to maximize the overall economic revenue with respect to the electricity production constraints imposed by regulations, safety precautions for safe operation of the electricity production system, and other variables that may be defined by an operator of the system so that, depending on market and regulatory conditions, the scheduler 115 may adjust operations of the GPU 107 and ASU 111 to increase and decrease their electricity demand to maximize the economic value provided by the operation of the electricity production system.

The scheduler 115 may determine an optimal oxygen distribution between the ASU oxygen separation and use of oxygen from the ASU storage tank by which an oxygen flow demand signal may be sent to the ASU to control operations of the ASU. In addition, the optimal $CO_2$ recovery rate target for the GPU 107 may be determined and sent to the control system for the GPU 107 for controlling operation of the GPU 107. The scheduler 115 may also calculate the estimated total electricity demand of the ASU 111 and GPU 107 based on the determined operational requirements for these elements and provide that information to the controller 113 for adding to the external electricity demand identified by the load management control 117 for identifying a total electricity production demand for the system. The total electricity production demand, or total power demand, may then be utilized by the coordinated Model Predictive Control 119 for determining how best to control the boiler unit 103, turbine 105, GPU 107 and ASU 111 to meet the determined overall power demand in view of the ASU 111 and GPU 107 operational determinations made by the scheduler 115 and communicated to the ASU 111 and GPU 107.

The scheduler 115 may be configured to ensure that as close to a maximum economic utilization of the electricity production system as possible is achieved. One example for how the scheduler 115 may be configured for operation is that when electricity prices are high (e.g. at peak times) and the ASU 111 is running at full load, the oxygen distribution of the ASU 111 may be configured to utilize a substantial amount of oxygen stored in the ASU tank to turn down the ASU 111 operations for separating oxygen gas from air to reduce its power consumption so that more electricity may be produced and sold to external customers. Alternatively, when electricity prices are lower (e.g. non-peak times), the ASU 111 may be configured to run at full capacity or close to full capacity to charge the ASU storage tank and also supply all or most of the oxygen gas to the boiler unit 103.

For the GPU 107, the scheduler 115 may be configured to determine a target $CO_2$ recovery rate so that during normal operations, a minimum requirement for $CO_2$ recovery is satisfied. But, in conditions where the price for electricity is low and the value to be provided by $CO_2$ recovery is high relative to the price of electricity to be charged, the GPU 107 operations can be increased to capture more $CO_2$ and use more electricity as the value of the captured $CO_2$ can more than offset the loss of revenue incurred from usage of more electricity generated by the system. But, in situations where the value of $CO_2$ credits may provide a higher value to the operator of the electricity production system for meeting regulatory requirements or for sale to third parties over a $CO_2$ credit exchange relative to the revenue received for sale of the produced electricity to third parties, the scheduler 115 may be configured to adjust GPU 107 operations to utilize more electricity so that the GPU 107 operates to recover more $CO_2$ as compared to situations where the value extracted by selling electricity to external customers provides more value to the operator of the system.

The controller 113 may be configured to control the ASU 111, GPU 107, boiler unit 103 and turbine 105 in a first mode by adding a first coordinated Model Predictive Control ("MPC") signal to the feedforward demand for the boiler unit 103 and a second coordinated MPC signal to the feedforward demand for the turbine unit 105. The first MPC signal and the second MPC signal may be determined by the coordinated MPC based on a difference between the determined total power demand and actual power generation and on a difference between the determined throttle pressure and a throttle set point. The feedforward demand for the boiler unit 103 may be generated by dividing the turbine first stage pressure by the steam turbine throttle pressure and multiplying the quotient of that division by the turbine throttle pressure set point (e.g. $(P_{1st\ stage}/P_{throttle})*P_{setpoint}$). The feedforward demand for the turbine 105 may be generated by indexing with the determined total unit load demand.

The controller 113 may be configured to control the ASU 111, GPU 107, boiler unit 103, and turbine 105 in a second mode by adding a third MPC signal to the feedforward demand for the boiler unit 103 and generating a fourth MPC signal as a demand for the turbine 105. The third MPC signal and the fourth MPC signal may be determined by the coordinated MPC based on a difference between the determined total power demand and actual power generation and a difference between the determined throttle pressure and a throttle set point. The feedforward demand for the boiler unit 103 may be generated from the determined unit load demand.

The controller 113 can also be configured to control the system in a third mode by adding the second MPC signal to the determined unit load demand to determine the demand for the boiler unit 103 and by adding the third MPC signal to the determined unit load demand to determine the demand for the turbine 105. The second MPC signal and the third MPC signal may be determined by the coordinated MPC based on a difference between the determined total power demand and actual power generation and a difference between the determined throttle pressure and a throttle set point.

It is contemplated that the controller 113 may be configured to communicate with the scheduler 115 to determine which of the modes of operation that controller should utilize for controlling operations of the electricity production system. Alternatively, the mode of operation may be pre-specified or selected by an operator that provides input to the controller as to which mode of operation is to be selected via an input device.

The controller 113 may be configured so that it utilizes different combinations of four MPC signals based on a selected mode of operation. The controller may utilize an output selector for selecting which of multiple different MPC signals it receives from different elements of the system for use in controlling operations of the system while deactivating the other outputs of such signals that are not needed for a particular selected mode so that multiple different models are not needed to be included in the coordinated Model Predictive Control 119 for controlling operations of the system. For instance, first and third MPC signals may be utilized when the controller 113 controls the system in the first mode, second and fourth MPC signals may be utilized when the controller 113 controls the system in the second mode of operation, and second and third trim signals may be utilized when the controller controls the system in the third mode of operation.

The coordinated Model Predictive Control 119 may be configured to incorporate a dynamic model of the power generation system. The dynamic model may be built by conducting a series of step testing on the four signals to be generated by the coordinated MPC 119. The response of the actual power generation and throttle pressure may be recorded during the step testing and the relationships between the four signals to be generated by the coordinated MPC 119 and the actual power generation and throttle pressure can be identified to determine the steady-state gains and time constants of the dynamic model.

The coordinated MPC 119 may be configured so that if the boiler following mode is selected, the step testing may be imposed on the first signal and the third signal that are to be generated by the coordinated MPC 119. The model between the first and the third signal and the actual power generation and throttle pressure may be identified to determine the steady-state gain and time constant for each input and output pair. The first signal and third signal may be generated by the coordinated MPC 119 in the boiler following mode during closed-loop operation based on the feedback from the controller 113 (e.g. as a DCS) and the existing model between the first and third signal and the actual power generation and throttle pressure. The first MPC signal may be configured during the testing and closed loop operation to be a corrective signal for correcting for a relationship between multiple variables such as the pressure of the throttle of the turbine, the set point for the throttle of the turbine, and the pressure of the first stage of the turbine. The third MPC signal may be configured to represent a correction factor for turbine and boiler operations utilizing a first function curve identifying determined relationship between the boiler unit 103 operations and the turbine 105 operations under a first set of operating conditions. This first curve may be determined upon setting up and commissioning of the electricity production system or the turbine 105 and the boiler unit 103.

The coordinated MPC 119 may be configured so that if the turbine following mode is selected, the step testing may be imposed on the second signal and the fourth signal that are to be generated by the coordinated MPC 119. The model between the second and the fourth signal and the actual power generation and throttle pressure may be identified to determine the steady-state gain and time constant for each input and output pair. The second signal and fourth signal may be generated by the coordinated MPC 119 in the turbine following mode during closed-loop operation based on the feedback from the controller 113 (e.g. as a DCS) and the existing model between the second and fourth signal and the actual power generation and throttle pressure. The second MPC signal may be configured to represent a correction factor for boiler and turbine operations utilizing a second function curve identifying determined relationship between the boiler unit 103 operations and the turbine 105 operations under a second set of operating conditions. This second curve may be determined upon setting up and commissioning of the electricity production system or the turbine 105 and the boiler unit 103. The fourth MPC signal may be considered a direct signal that may provide a turbine master demand for use in controlling turbine operations. The fourth MPC signal may be based on the determined pressure of the turbine and the power generation set point for the turbine (e.g. a desired power generation output for the steam generator).

The coordinated MPC 119 may be configured so that if the coordinated control mode is selected, the step testing may be imposed on the second signal and the third signal that are to be generated by the coordinated MPC 119. The model between the second and the third signal and the actual power generation and throttle pressure may be identified to determine the steady-state gain and time constant for each input and output pair. The second signal and third signal may be generated by the coordinated MPC 119 in the coordinated control mode during closed-loop operation based on the feedback from the controller 113 (e.g. as a DCS) and the existing model between the second and third signal and the actual power generation and throttle pressure.

The coordinated Model Predictive Control 119 may also be configured so that it can read periodically the measurements of the actual power generation and throttle pressure from the controller 113 (e.g. as a DCS) and compare it with the model prediction from the coordinated MPC 119 for mismatch calculation between the dynamic model and the process as a feedback to the coordinated MPC 119.

The coordinated Model Predictive Control 119 may also be configured to incorporate an optimization engine to solve the optimization problem for the electricity production system based on a pre-defined cost objective function, a series of pre-defined process and control constraints, and the measurement feedback from the power generation system.

It should be appreciated that any of the above noted features of an energy production system in any particular embodiment expressly discussed herein may be combined with other features or elements of other embodiments except when such a combination would be mutually exclusive or otherwise incompatible therewith as may be appreciated by those of at least ordinary skill in the art. It should also be appreciated that different variations to the above discussed embodiments may be made to meet a particular set of design criteria. For instance, the furnace of the boiler unit 103 may be configured to combust fuel in multiple combustion zones. The furnace of the boiler unit 103 may include only one burner or may include a plurality of spaced apart burners. As yet another example, the GPU 107 may be configured to capture $CO_2$ from the flue gas via at least one absorption mechanism, at least one adsorption mechanism, or a combination of absorption and adsorption mechanisms. As yet another example, heat exchangers, pumps, fans, and other elements may also be added to embodiments of the system to facilitate fluid movement or help control changes in the operation of the system. As yet another example, the ASU may have multiple storage tanks, such as multiple oxygen retaining vessels, for retaining oxygen gas or storing such gas until that gas is needed to be fed to the boiler unit 103. As yet another example, embodiments of the MPC may be configured to utilize more than four MPC signals or less than four MPC signals and may transmit only one corrective signal in some modes or may transmit any number of multiple signals in different modes of operation for different embodiments of the system.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of operating an electricity production system having at least one oxy-combustion boiler unit, a turbine for electricity generation, an air separation unit and a gas processing unit comprising:

for each of a first mode, a second mode, and a third mode of operation:
  determining an oxygen distribution between oxygen gas to be separated by the air separation unit and oxygen gas stored in a storage tank of the air separation unit to be fed to the boiler unit;
  determining a carbon capture value for the gas processing unit via a scheduler;
  determining a power consumption value for the gas processing unit and the air separation unit based on the carbon capture value and the determined oxygen distribution and determining a total power demand based on the power consumption value of the gas processing unit and the air separation unit and a determined electricity demand from one of a pre-specified electricity demand value, a grid frequency value, and an automatic dispatch system value; and
  controlling the boiler unit, the turbine, the air separation unit, and the gas processing unit based on the determined total power demand along with correcting signals determined by a coordinated Model Predictive Control ("MPC").

2. The method of claim 1, comprising:
selecting the first mode of operation, the first mode being a boiler following mode;
determining a demand for the boiler unit by adding a first signal from the MPC to a feedforward demand for the boiler unit that is based on a difference between a determined total power demand and actual power generation and a difference between a determined throttle pressure and a throttle set point, the feedforward demand for the boiler unit being determined from an equation:

$$(P_{1st\,stage}/P_{throttle})^* P_{setpoint}$$

where $P_{1ststage}$ is a pressure of a first stage of the turbine, $P_{throttle}$ is a determined or measured pressure of the throttle, and $P_{setpoint}$ is a set point for the pressure of the throttle;
determining a demand for the turbine by adding a second signal from the MPC to a feedforward demand for the turbine that is based on a difference between the determined total power demand and actual power generation and a difference between the determined throttle pressure and the throttle set point, the feedforward demand for the turbine being generated by indexing with the determined total unit load demand; and
controlling the air separation unit based on the demand for the boiler unit to maintain oxygen gas to the boiler unit necessary for the boiler unit to meet the determined demand of the boiler unit.

3. The method of claim 2, comprising:
selecting the second mode of operation, the second mode being a turbine following mode;
when in the second mode of operation, determining a demand for the boiler unit by adding a third signal from the MPC to the feedforward demand for the boiler unit that is based on a difference between the determined total power demand and actual power generation and a difference between the determined throttle pressure and the throttle set point, the feedforward demand for the boiler unit being generated from the determined unit load demand when the second mode is selected;
when in the second mode of operation, determining a demand for the turbine by identifying a fourth signal from the MPC that is based on a difference between the determined total power demand and actual power generation and a difference between the determined throttle pressure and the throttle set point.

4. The method of claim 3, comprising:
selecting the third mode of operation, the third mode being a coordinated control mode; and
when in the third mode of operation, determining a demand for the boiler unit by adding the second signal to the determined unit load demand and determining a demand for the turbine by adding the third signal to the determined unit load demand for controlling the turbine and the boiler unit to maintain throttle pressure and electricity production.

5. The method of claim 1, wherein the determining of the carbon capture value for the gas processing unit via the scheduler is based on at least one of a determined power price, a determined value of captured carbon dioxide, an air separation unit turndown ratio, a gas processing unit turndown ratio, and capacity of the storage tank of the air separation unit.

6. The method of claim 1 wherein the determining of the oxygen distribution between oxygen gas to be separated by the air separation unit and oxygen gas stored in the storage tank of the air separation unit to be fed to the boiler unit via the scheduler is based on at least one of a determined power price, an air separation unit turndown ratio, and a determined capacity of the storage tank of the air separation unit.

7. The method of claim 1, wherein the determining of the power consumption value for the gas processing unit and the air separation unit based on the carbon capture value and the determined oxygen distribution is determined via the scheduler and is based on (i) the determined oxygen distribution between oxygen gas to be separated by the air separation unit and oxygen gas stored in the storage tank; and (ii) a determined amount of carbon to be captured by the gas processing unit.

8. An electricity production system comprising:
an oxy-fired boiler unit configured to combust fuel and generate steam;
an air separation unit configured to separate oxygen gas from air for feeding the oxygen gas to the boiler unit for combustion of fuel;
a turbine configured to receive steam emitted by the boiler unit for generating electricity;
a gas processing unit configured to receive the flue gas emitted by the boiler unit for capturing carbon dioxide; and
a controller communicatively connected to the boiler unit, the turbine, the air separation unit, and the gas processing unit, the controller having at least one non-transitory memory and at least one processor connected to the memory, the controller being configured to:
determine an oxygen distribution between oxygen gas to be separated by the air separation unit and oxygen gas stored in a storage tank of the air separation unit to be fed to the boiler unit;
select a carbon capture value for the gas processing unit;
determine a power consumption value for the gas processing unit and the air separation unit;
determine a total power demand based on the power consumption value of the gas processing unit and the air separation unit, and on a determined electricity demand from one of a pre-specified electricity demand value, a grid frequency value, and an automatic dispatch system value; and
control the boiler unit, the turbine, the air separation unit, and the gas processing unit based on the determined total power demand along with correcting signals determined from a coordinated Model Predictive Control ("MPC").

9. The system of claim 8, wherein the controller is configured to:
determine a demand for the boiler unit based on the determined total power demand along with a first correcting signal generated from the MPC that is based on a difference between a determined total power demand and actual power generation and a difference between a determined throttle pressure and a throttle set point;
determine a demand for the turbine based on the determined total power demand along with a second correcting signal generated from the MPC that is based on a difference between the determined total power demand and actual power generation and a difference between a determined throttle pressure and a throttle set point;
control the air separation unit based on the determined demand for the boiler unit so that oxygen gas is supplied from the air separation unit to the boiler unit for the boiler unit to meet the determined demand for the boiler unit.

10. The system of claim 8, wherein the controller is configured to:
control the turbine based on a determined throttle pressure and a difference between the determined throttle pressure and a throttle pressure set point; and
determine a unit load demand and modify that unit load demand with a first of the correcting signals determined via the MPC for controlling operation of the boiler unit.

11. The system of claim 8, wherein the controller is configured to:
control the turbine and the boiler unit to also control throttle pressure and electricity production.

12. The system of claim 8, wherein the carbon capture value for the gas processing unit is determined via a scheduler based on at least one of a determined power price, a determined value of captured carbon dioxide, an air separation unit turndown ratio, a gas processing unit turndown ratio, and capacity of the storage tank of the air separation unit.

13. The system of claim 8, wherein the oxygen distribution between oxygen gas to be separated by the air separation unit and oxygen gas stored in the storage tank of the air separation unit to be fed to the boiler unit is determined via a scheduler based on at least one of a determined power price, an air separation unit turndown ratio, and a determined capacity of the storage tank of the air separation unit.

14. The system of claim 8, wherein the power consumption value for the gas processing unit and the air separation unit is determined with a scheduler based on (i) the determined oxygen distribution between oxygen gas to be separated by the air separation unit and oxygen gas stored in the storage tank; and (ii) an amount of carbon to be captured by the gas processing unit.

15. A controller for an electricity production system having an oxy-fired boiler unit and a turbine, the controller comprising:
at least one processor;
at least one non-transitory memory communicatively connected to the at least one processor;
at least one transceiver communicatively connected to the at least one processor;
the controller being configured to:
determine an oxygen distribution between oxygen gas to be separated by an air separation unit and oxygen gas stored in a storage tank of the air separation unit to be fed to the boiler unit;
select a carbon capture value for a gas processing unit;
determine a power consumption value for the gas processing unit and the air separation unit;
determine a total power demand based on the power consumption value of the gas processing unit and the air separation unit, and on a determined electricity demand from one of a pre-specified electricity demand value, a grid frequency value, and an automatic dispatch system value; and
control the boiler unit, the turbine, the air separation unit, and the gas processing unit based on the determined total power demand along with correcting signals from a coordinated Model Predictive Control ("MPC").

16. The controller of claim 15 wherein the controller comprises:
a scheduler;

a load management control; and
the MPC.

17. The controller of claim 15, wherein the controller is configured to:
- determine a total power demand based on the power value for the gas processing unit and the air separation unit, and on the determined electricity demand;
- determine a demand for the boiler unit based on the determined total power demand along with a first correcting signal generated from the MPC that is based on a difference between a determined total power demand and actual power generation and a difference between a determined throttle pressure and a throttle set point;
- control the air separation unit based on the demand for the boiler unit to maintain sufficient oxygen gas flow to the boiler unit.

18. The controller of claim 15, wherein the controller is configured to:
- determine a demand for the turbine unit based on the determined total power demand along with a first correcting signal generated from the MPC that is based on a difference between a determined total power demand and actual power generation and a difference between a determined throttle pressure and a throttle set point.

19. The controller of claim 15, wherein the controller is configured to:
- control the turbine and the boiler unit to control throttle pressure and electricity production.

20. The controller of claim 15, wherein the carbon capture value for the gas processing unit is determined by a scheduler based on at least one of a determined power price, a determined value of captured carbon dioxide, an air separation unit turndown ratio, a gas processing unit turndown ratio, and capacity of the storage tank of the air separation unit.

* * * * *